United States Patent
Koch et al.

(10) Patent No.: US 8,869,677 B2
(45) Date of Patent: Oct. 28, 2014

(54) PISTON FOR A BRAKE CALIPER OF A DISC BRAKE

(75) Inventors: Dirk Koch, Lollar-Odenhausen (DE); Herwig Bauer, Bad Vilbel (DE); Thomas Winkler, Mainz (DE); Anja Klimt, Frankfurt/M (DE); Uwe Zeibig, Achern (DE)

(73) Assignees: Continental Teves AG & Co. oHG (DE); Erdrich-Beteiligungs GmbH (DE)

( * ) Notice: Subject to any disclaimer, the term of this patent is extended or adjusted under 35 U.S.C. 154(b) by 1054 days.

(21) Appl. No.: 12/739,808

(22) PCT Filed: Oct. 23, 2008

(86) PCT No.: PCT/EP2008/064348
§ 371 (c)(1),
(2), (4) Date: Apr. 26, 2010

(87) PCT Pub. No.: WO2009/053425
PCT Pub. Date: Apr. 30, 2009

(65) Prior Publication Data
US 2011/0315007 A1 Dec. 29, 2011

(30) Foreign Application Priority Data
Oct. 27, 2007 (DE) .......................... 10 2007 051 456

(51) Int. Cl.
*F16J 1/00* (2006.01)
*F16D 65/18* (2006.01)
*F16D 127/06* (2012.01)
*F16D 125/40* (2012.01)
*F16D 125/06* (2012.01)

(52) U.S. Cl.
CPC ............ *F16D 65/18* (2013.01); *F16D 2127/06* (2013.01); *F16D 2125/40* (2013.01); *F16J 1/001* (2013.01); *F16J 1/005* (2013.01); *F16D 2125/06* (2013.01); *F16D 2250/0023* (2013.01)
USPC ............................ 92/172; 92/169.1; 188/71.9

(58) Field of Classification Search
CPC ................. F16J 1/00; F16J 10/04; F16J 1/09; F16J 10/02
USPC .................................. 92/169.1, 172; 188/71.9
See application file for complete search history.

(56) References Cited

U.S. PATENT DOCUMENTS 3,532,030 A * 10/1970 Grenville ........................ 92/208
3,688,875 A 9/1972 De Hoff et al.
(Continued)

FOREIGN PATENT DOCUMENTS

DE 199 39 873 A1 8/1999
DE 10 2005 061 354 A1 6/2007
(Continued)

*Primary Examiner* — Charles Freay
*Assistant Examiner* — Patrick Hamo
(74) *Attorney, Agent, or Firm* — RatnerPrestia

(57) ABSTRACT

A piston for a brake caliper of a disc brake constructed as a pot which is open at one end, having a longitudinal axis, a wall, and a piston head. The piston is supported in a cylinder of the brake caliper such that it can be moved along the longitudinal direction, and it can be placed against a brake pad in the region of the piston head by an axial contact surface. When the piston is subjected to pressure by a hydraulic fluid, the piston moves in the cylinder and presses the brake pad against a brake disc. A projection having a conical surface is provided on an inner surface of the piston head. A recess is provided, which is substantially at the same distance from the longitudinal axis as the projection on the inner surface of the piston head, on an outer surface of the piston head.

12 Claims, 2 Drawing Sheets

(56) References Cited

U.S. PATENT DOCUMENTS

| | | |
|---|---|---|
| 4,793,447 A | 12/1988 | Taig et al. |
| 5,105,917 A * | 4/1992 | Sporzynski et al. ......... 188/72.4 |
| 5,219,047 A | 6/1993 | Fouilleux et al. |
| 5,350,042 A * | 9/1994 | Thiel ............................ 188/71.9 |
| 6,053,289 A * | 4/2000 | Bauer et al. .................. 188/71.9 |
| 6,637,317 B1 * | 10/2003 | Zeibig et al. .................... 92/208 |
| 8,037,810 B2 * | 10/2011 | Leidecker et al. .............. 92/172 |
| 2008/0314239 A1 | 12/2008 | Leidecker et al. |
| 2009/0133975 A1 | 5/2009 | Gilles |

FOREIGN PATENT DOCUMENTS

| | | |
|---|---|---|
| JP | 10-122280 | 5/1998 |
| WO | WO 93/00524 | 1/1993 |
| WO | WO 2007/036357 A1 | 4/2007 |
| WO | WO 2007071640 A1 * | 6/2007 |

* cited by examiner

PISTON FOR A BRAKE CALIPER OF A DISC BRAKE

CROSS REFERENCE TO RELATED APPLICATIONS

This application is the U.S. national phase application of PCT International Application No. PCT/EP2008/064348, filed Oct. 23, 2008, which claims priority to German Patent Application No. 10 2007 051 456.7, filed Oct. 27, 2007, the contents of such applications being incorporated by reference herein.

FIELD OF THE INVENTION

The invention relates to a piston for a brake caliper of a disc brake, which is produced in forming processes from a metallic material, in particular from a flat metal sheet. The piston is designed as a pot which is open at one end, having a longitudinal axis, a wall, and a piston head. A piston of this kind is supported in a cylinder of the brake caliper in such a way that it can be moved along the longitudinal direction, and it can be placed against a brake pad in the region of the piston head by means of an axial contact surface. When the piston is subjected to pressure by a hydraulic fluid, the piston moves in the cylinder and presses the brake pad against a brake disc. The piston can furthermore have a mechanical force applied to it by means of a drive nut. For this purpose, a projection having a conical surface is provided on an inner surface of the piston head.

BACKGROUND OF THE INVENTION

A piston of this kind is known from WO 2007/036357 A1, which is incorporated by reference. Here, the piston is provided in a disc brake in such a way that it can be moved electromechanically and hydraulically. In the case of electromechanical actuation, a drive spindle is made to rotate by an electric motor via a gear mechanism. In the process, a thread on the spindle interacts with a drive nut which is provided in a rotationally fixed manner, causing the latter to be moved axially. The drive nut comes to rest against a conical surface in the piston and thus transmits the movement to the piston and the brake pad. The conical surface is arranged at the transition between the piston head and the wall, resulting in a thickened portion in this region which leads to a relatively high weight and makes the piston difficult to produce.

SUMMARY OF THE INVENTION

It is an object of the invention to specify a piston which avoids the disadvantages of the prior art and, in particular, comprises a design which is optimized in terms of weight and production.

This object is achieved, according to aspects of the invention, by providing a recess, which is substantially at the same distance from the longitudinal axis as the projection on the inner surface of the piston head, on an outer surface of the piston head. The result of this advantageous configuration of the piston head is that the conical surface can be produced by a simple forming operation on the piston head without the need for an accumulation of material, which would increase the weight. The projection on the inner surface is therefore formed at least partially by forming the recess in the outer surface. Here, the complementary arrangement of the projection and the recess in the piston head has a positive effect on the flow of force when the disc brake is actuated mechanically. Overall, a shape-induced stiffening of the piston head is achieved with the annular recess and the projection.

A particularly advantageous configuration of the invention comprises the piston head having a substantially constant wall thickness in a certain section in the region of the conical surface. The recess and the projection on the piston head can thus be produced in a very simple manner since the flat metal sheet used as a starting material does not have to be thickened by forming operations. The conical surface on the projection on the inner surface of the piston can be produced by forming the recess in the initially still flat piston head from the outside by means of a punch, thereby causing the projection to emerge in parallel on the inner surface of the piston. To obtain a more defined conical surface on the projection, a die which has the negative shape of the projection and of the conical surface can be held against the inner surface of the piston during the forming of the recess in the outer side, as an addition to the punch.

Another possibility within the scope of the invention is for there to be a gap between the projection on the piston head and the wall of the piston. This gap can be of different sizes, the gap being more of a fold in the case of pistons with a small diameter, whereas a volume in the form of a gap is present in the case of larger piston diameters. This gap or fold is a feature of the invention which makes it possible for the first time to eliminate the need for disadvantageous thickening to form the conical surface for the mechanical actuation of a piston of a brake caliper, as was hitherto indicated in the prior art.

As a further worthwhile detail, it may be included within the scope of the invention that the recess in the piston head merges into the contact surface and that the contact surface is larger than across-sectional area at the thinnest point of the wall of the piston.

An equivalent means of achieving the object of the invention introduces a piston for a brake caliper of a disc brake, which is produced in forming processes from a metallic material, in particular from a flat metal sheet, and is constructed in one piece as a pot which is open at one end, having a longitudinal axis, a wall, and a piston head, and can be placed against a brake pad in the region of the piston head by means of an axial contact surface, a conical surface being provided on an inner surface of the piston, and the conical surface being provided on a thin-walled cup, which forms part of a two-piece construction with the piston. This is an alternative way of avoiding the thickened accumulation of material of the prior art.

One advantageous option is to produce both the cup and the piston pot from a metallic material, in particular a flat metal sheet.

By connecting the cup in a sealing manner to the wall of the piston, a small dead volume of the piston is achieved since only a relatively small amount of hydraulic fluid can be accommodated in the interior of the piston. The leaktight joint between the piston and the cup can be welded by means of a laser but other forms of joining are also possible, e.g. friction welding. Reducing the dead volume in the piston and hence also in the brake caliper has the effect of increasing hydraulic rigidity in the brake system and hence of improved hydraulic behaviour.

It is central to both ways of achieving the object of the invention that the conical surface in the piston has a simple configuration which saves materials and is optimized for production. Irrespective of whether the conical surface is formed on the separate cup or on the projection in the piston head, the conical surface is advantageously configured if the conical surface encloses an angle α of 30° to 75° with the longitudinal axis of the piston in the axial direction. In this angular range, the conical surface in interaction with the drive nut of the brake caliper performs a dual function as a coupling and centring means. It is particularly advantageous if the angle α is substantially 60°.

To ensure that the brake caliper performs its function in the case of mechanical actuation, an anti-twist safeguard is arranged effectively at least between the drive nut and the piston. This is preferably designed as a positive-locking anti-twist safeguard which interacts with a drive nut.

According to one embodiment of the anti-twist safeguard, the anti-twist safeguard is constructed in one piece with the piston at an open end of the piston. For this purpose, the edge of the wall can be formed inwards, towards the longitudinal axis of the piston, at the open end of the piston, during the production of the piston or after the formation of the piston head. This gives rise to an axial end surface, into which a contour can be introduced. Since a complementary contour is provided on the drive nut in this arrangement, the piston and the drive nut are connected in a positive-locking manner, in such a way as to be rotationally fixed to one another with respect to the longitudinal axis of the piston and secured against twisting relative to one another, by means of the contour in the end surface.

Another embodiment of the anti-twist safeguard between the piston and the drive nut discloses making the anti-twist safeguard part of a two-piece construction with the piston, the anti-twist safeguard being connected firmly to the wall at the open end of the piston. In particular, the anti-twist safeguard in this case can be designed as an insert which is crimped to the wall of the piston.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
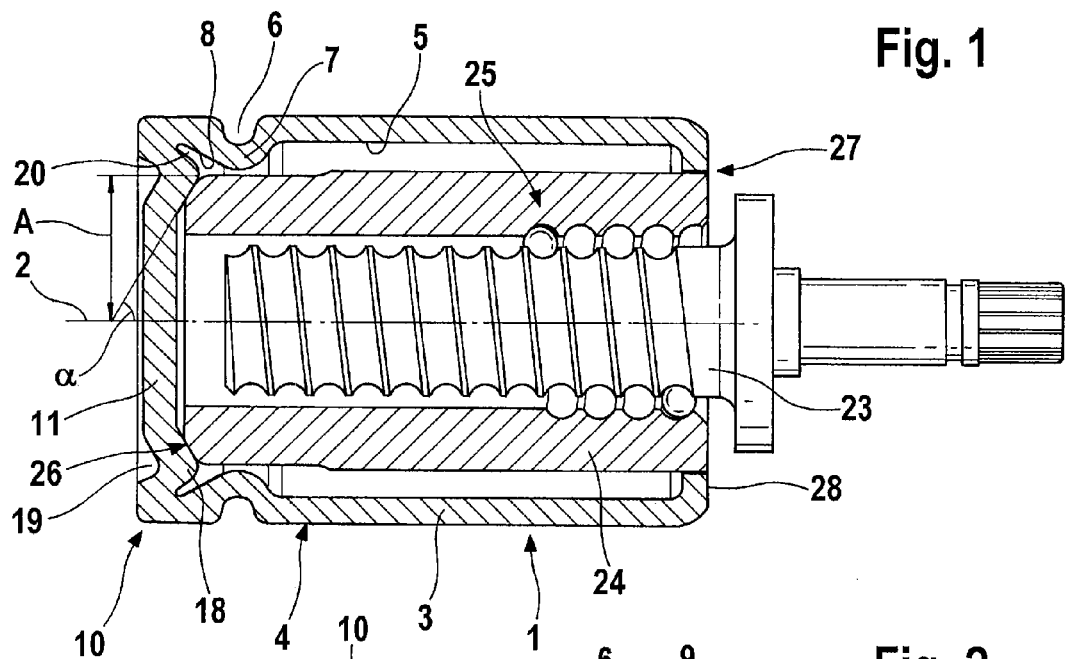
FIG. 1 shows a first embodiment of a piston together with a drive nut and a drive spindle.

FIG. 1 shows a piston 1 with a drive spindle 23 and a drive nut 24 in longitudinal section. The piston 1, which is embodied in such a way as to be rotationally symmetrical about a longitudinal axis 2, is configured as a pot which is open at one end, having a wall 3 and a piston head 11, it being possible for the piston head 11 to be placed against a brake pad (not shown) at the closed end of the piston 1 by means of an axial contact surface 12. The contact surface 12 is larger than a cross-sectional area 9 at the weakest point of the wall 3. Moreover, a circumferential groove 6 is rolled into an outer side 4 of the wall 3 in the vicinity of the contact surface 12, the said groove serving to receive a piston protection cap (not shown) when the piston is installed in the brake caliper. The contour of the rolled-in groove 6 is continued throughout the entire cross section of the wall 3 and thus gives rise to a shoulder 7 on an inner side 5 of the wall 3 of the piston 1.

Arranged on an inner surface 13 of the piston head 11 is a projection 18 with a conical surface 15, against which the drive nut 24 can be placed. In this arrangement, the conical surface 15 preferably encloses an angle α of about 60° with the longitudinal axis 2 in the axial direction, thereby ensuring centred and defined contact with the drive nut 24.

Figure 3:
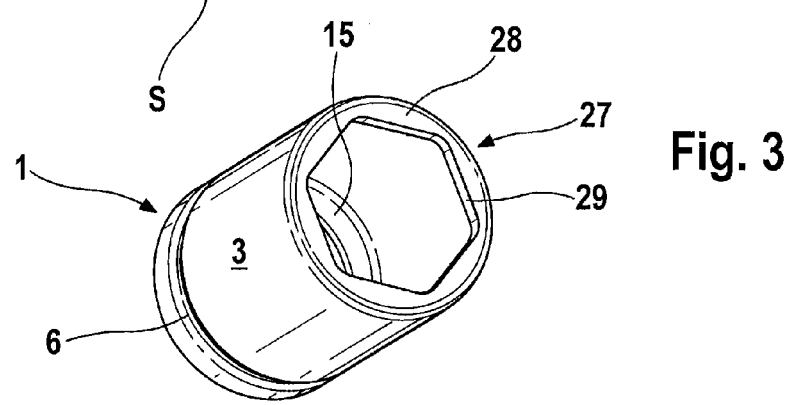
FIG. 3 shows a perspective view of the open end of the piston.

The piston 1 and the drive nut 24 are connected to one another in a rotationally fixed manner relative to the longitudinal axis 2 and are held in such a way that they can be moved relative to one another in the axial direction. The piston 1 or the drive nut 24 are secured against twisting in the brake caliper housing in a manner which is not shown. As shown in FIG. 3, the anti-twist safeguard 27 between the piston 1 and the drive nut 24 is achieved by providing the open end of the piston 1 with an integral end surface 28 that has a contour 29 which forms the positive-locking anti-twist safeguard 27 together with a complementary contour on the drive nut 24.

In the case of mechanical actuation of the disc brake, the drive spindle 23 arranged in the drive nut 24 is turned, for example by means of an electric motor with a gear mechanism arranged on the output side. Since the drive spindle 23 and the drive nut 24 are provided with a ball screw thread 25, the rotary motion of the drive spindle 23 is converted by the ball screw thread 25 into an axial movement of the drive nut 24. The said nut comes to rest against the piston 1 by means of a conical surface 26 complementary to the conical surface 15 and moves the said piston.

Figure 2:
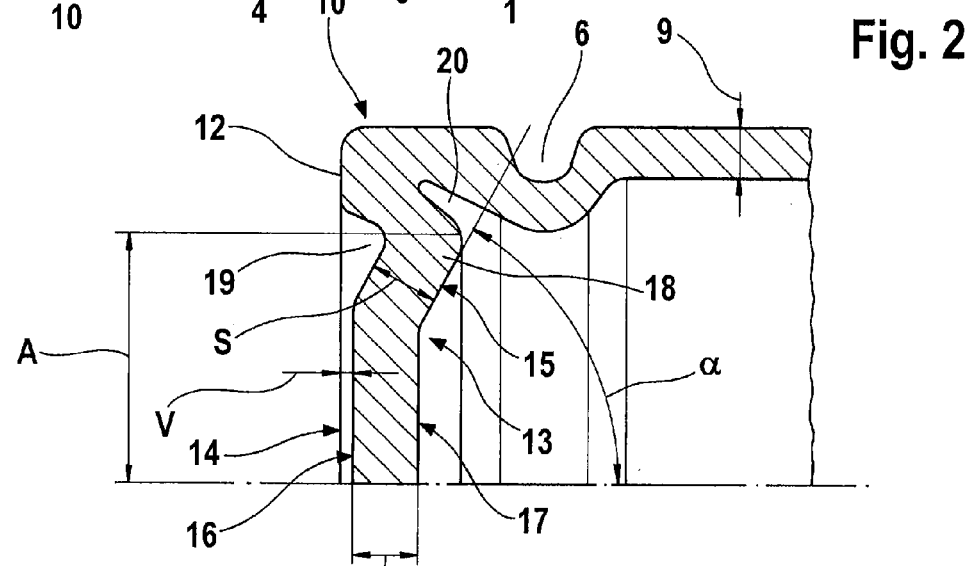
FIG. 2 shows an enlarged detail of the piston in FIG. 1.

The geometrical configuration of the transitional region 10 between the wall 3 and the piston head 11 is illustrated on an enlarged scale in FIG. 2. In its outer surface 14, the piston head 11 has a recess 19 and, on its inner surface 13, has the projection 18, which is formed in a rotationally symmetrical manner, in a ring around the longitudinal axis 2. The recess 19 is formed in the piston head 11 from the outside by forming, resulting in the emergence of the projection 18 in parallel on the inner surface 13 of the piston head 11. The recess 19 is substantially at the same distance A from the longitudinal axis 2 of the piston 1 as the projection 18.

Starting from the longitudinal axis 2 of the piston 1, the piston head 11 is described by a flat outer and a flat inner head surface 16, 17, both of which extend substantially perpendicularly to the longitudinal axis 2. The outer head surface 16 is designed with a slight axial offset V in relation to the axial maximum dimension of the piston 1, making it impossible for this region of the piston 1 to be placed against a brake pad (not shown). The flat outer head surface 16 merges into the annular recess 19, which has a rounded triangular contour in longitudinal section. The inner flat head surface 17 opens out into the annular projection 18, which rises substantially parallel to the recess 19 from the piston head 11 and bears the conical surface 15. The projection 18 is formed closer to the longitudinal axis 2 than the recess 19 by an amount which allows a substantially constant wall thickness S in the piston head 11. Like the recess 19, the projection 18 has a rounded triangular contour.

Likewise starting from the longitudinal axis 2, both the recess 19 and the projection 18 are formed backwards in the axial direction, the recess 19 merging directly into the contact surface 12. Together with the shoulder 7 on the inner side 5 of the wall 3, the projection 18 on the inner surface 13 of the piston head 11 forms a gap 20 brought about by folding, making it possible to form the conical surface 15 for contact with a drive nut 24 without a thickened portion in the transitional region 10. Depending on the size of the piston diameter, the gap 20 will tend to be a more or less zero-volume fold at small diameters or a volume in the form of a gap at large diameters. The inner shoulder surface 8 facing the piston head 11 can furthermore be designed as a bevel.

Figure 4:
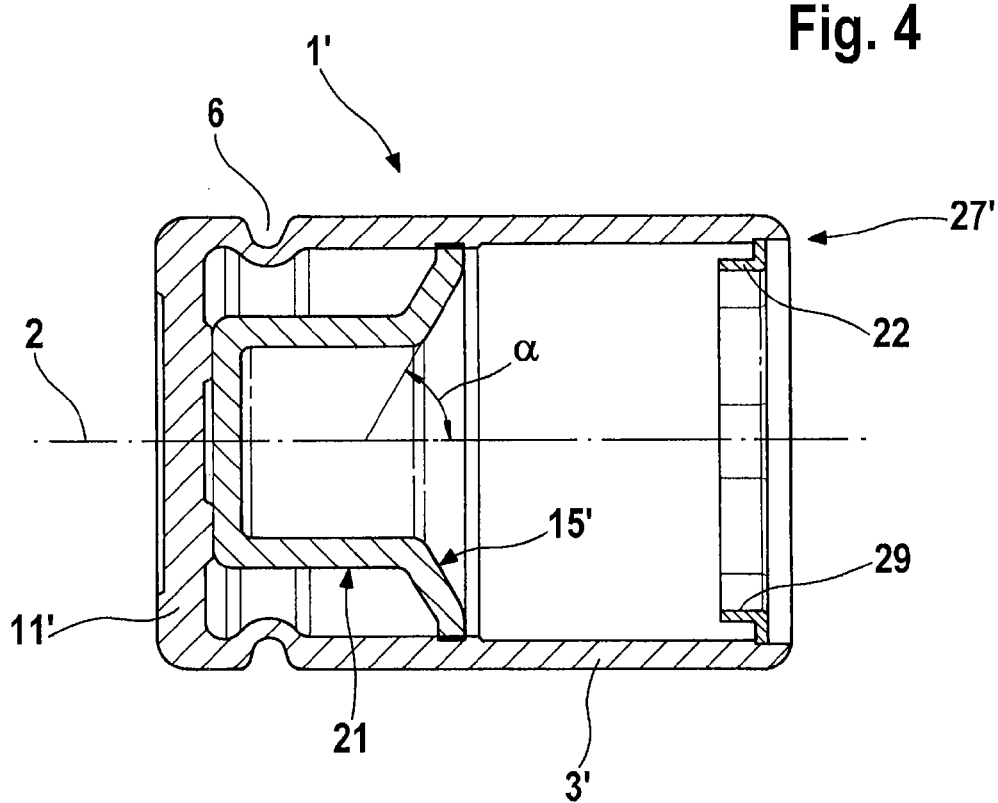
FIG. 4 shows a second embodiment of a piston.
Figure 5:
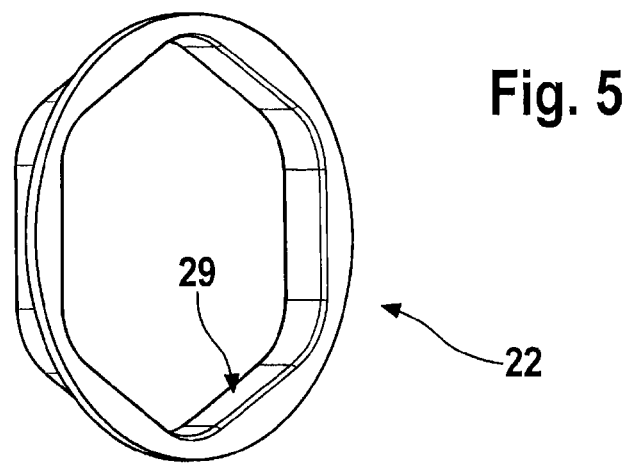
FIG. 5 shows a perspective view of the insert shown in FIG. 4.

FIG. 4 shows an embodiment corresponding to an equivalent means of achieving the object of the invention. Here, the piston head 11' of the piston 1' does not have a projection but forms the conical surface 15' for the application of a drive spindle on a cup 21, which forms part of a two-piece arrangement, as a separate component, in the piston 1' and is produced from a flat metal sheet by forming. This cup 21 is supported axially against the piston head 11' and is connected in a sealing manner to the wall 3' of the piston 1'. This has the effect that the dead volume of the piston 1' is reduced, the leaktight connection between the cup 21 and the wall 3' being achieved by means of laser or friction welding. In this arrangement, the conical surface 15' of the cup 21 preferably encloses an angle α of about 60° with the longitudinal axis 2 in the axial direction.

This illustrative embodiment of the equivalent solution will also be used to show a further way of embodying an anti-twist safeguard 27' between the drive nut and the piston 1', although there is no intention to restrict this safeguard to the illustrative embodiment under consideration. Here, an insert 22 is provided, this insert being connected in a rotationally fixed manner to the wall 3', by crimping for example. This insert 33 bears the contour 29, which forms the positive-locking anti-twist safeguard 27' with a complementary contour on the drive nut. The contour 29 can be in the form of a rounded hexagon.

The invention claimed is:

1. Piston for a brake caliper of a disc brake, which is produced in forming processes from a metallic material and is constructed as a pot which is open at one end, said piston comprising:
   a longitudinal axis, a wall, and a piston head,
   wherein the piston is configured to be placed against a brake pad in a region of the piston head by an axial contact surface,
   a projection having a conical surface for an application of a drive nut for mechanical actuation being provided on an inner surface of the piston head,
   wherein a recess, which is substantially at a same distance (A) from the longitudinal axis as the projection, is provided in an outer surface of the piston head,
   wherein the piston and the drive nut are each produced in a forming process from a flat metallic sheet metal,
   wherein a positive-locking anti-twist safeguard for the piston interacts with the drive nut, and
   wherein the anti-twist safeguard is constructed with the piston at an open end of the piston.

2. Piston according to claim 1, wherein the projection on the inner surface is formed at least partially by forming the recess in the outer surface.

3. Piston according to claim 1, wherein the piston head has a substantially constant wall thickness (S) in a certain section in the region of the conical surface.

4. Piston according to claim 1, wherein a gap is defined between the projection and the wall.

5. Piston according to claim 1, wherein the recess merges into the contact surface.

6. Piston according to claim 1, wherein the contact surface is larger than a cross-sectional area at a thinnest point of the wall.

7. Piston according to claim 1, wherein the anti-twist safeguard forms part of a two-piece construction with the piston and is firmly connected to the wall at an open end of the piston.

8. Piston according to claim 1, wherein the conical surface encloses an angle (α) of 30° to 75° with the longitudinal axis.

9. Piston according to claim 8, wherein the angle (α) is 60°.

10. Piston for a brake caliper of a disc brake, which is produced in forming processes from a flat metallic sheet metal material and is constructed as a pot which is open at one end, said piston comprising:
    a longitudinal axis, a wall, and a piston head,
    wherein the piston is configured to be placed against a brake pad in a region of the piston head by an axial contact surface,
    a conical surface being provided on an inner surface of the piston,
    wherein the conical surface is provided on a thin-walled cup, which is produced in a forming process from a flat metallic sheet metal and forms part of a two-piece construction with the piston,
    wherein a positive-locking anti-twist safeguard for the piston interacts with a drive unit.

11. Piston according to claim 10, wherein the cup is connected in a sealing manner to the wall.

12. Piston for a brake caliper of a disc brake, which is produced in forming processes from a flat metallic sheet metal material and is constructed as a pot which is open at one end, said piston comprising:
    a longitudinal axis, a wall, and a piston head,
    wherein the piston is configured to be placed against a brake pad in a region of the piston head by an axial contact surface,
    a conical surface being provided along an inner surface of the pot,
    wherein the conical surface is provided on a thin-walled member positioned in the pot such that thin-walled member is supported axially against the piston head and sealingly engages the wall, wherein the thin-walled member is produced in a forming process from a flat metallic sheet metal, and
    wherein a positive-locking anti-twist safeguard for the piston interacts with a drive unit.

* * * * *